United States Patent [19]

Whiteside

[11] Patent Number: 4,721,316

[45] Date of Patent: Jan. 26, 1988

[54] CREEPER

[75] Inventor: Kirt E. Whiteside, Ostrander, Ohio

[73] Assignee: Whiteside Mfg. Company, Delaware, Ohio

[21] Appl. No.: 910,201

[22] Filed: Sep. 22, 1986

[51] Int. Cl.[4] .............................................. B62B 11/00

[52] U.S. Cl. .................................................... 280/32.6

[58] Field of Search ............ 280/32.6, 79.1 R, 79.1 A; 108/901

[56] References Cited

U.S. PATENT DOCUMENTS

| | | | |
|---|---|---|---|
| 1,104,398 | 7/1914 | Zimmerman | 280/32.6 |
| 1,431,383 | 10/1922 | Edwards | 280/32.6 |
| 2,084,957 | 6/1937 | Hulbert | 280/32.6 |
| 2,124,389 | 7/1938 | Woelfer | 280/32.6 |
| 2,424,032 | 7/1947 | Henderson | 280/32.6 |
| 3,757,704 | 9/1973 | Allgeyer et al. | 108/901 |
| 4,244,594 | 1/1981 | Hines | 280/32.6 |
| 4,246,734 | 1/1981 | Fogle et al. | 108/901 |
| 4,428,306 | 1/1984 | Dresen et al. | 108/901 |
| 4,570,957 | 2/1986 | Rose | 280/32.6 |

FOREIGN PATENT DOCUMENTS 963389 7/1964 United Kingdom .

*Primary Examiner*—David M. Mitchell
*Attorney, Agent, or Firm*—Sidney W. Millard

[57] ABSTRACT

A blow-molded creeper includes a flat upper surface having a head rest for the mechanic. The shell of the creeper includes an upper sheet and a lower sheet. In the lower sheet are a plurality of ribs and truncated cones which project upwardly into engagement with the thermo-plastic upper sheet which forms the upper surface of the creeper. The ribs and truncated cones are bonded to the upper surface to provide structural integrity.

16 Claims, 6 Drawing Figures

3
3
10
12
14
16
18
20
21
22
24
25
26
28
30
32
34
36
38

CREEPER

FIELD OF THE INVENTION

This invention relates to a creeper used by mechanics for working under automobiles while in the prone position.

BACKGROUND OF THE INVENTION

Creepers are platforms mounted on four or more casters having a flat or contoured upper surface to support a mechanic while he is working under an automobile. Conventionally, the creeper will have four or more casters mounted on its lower surface to allow the workman to roll about and change positions during the time he is working. A patent to Zimmerman, U.S. Pat. No. 1,104,398, discloses this broad combination and also includes a head rest and a pair of tool boxes, one on each side, for containing bolts, nuts, and the like.

A transparent shield for a similar creeper is shown in a patent to Edwards, U.S. Pat. No. 1,431,383. The shield is designed to be between the work area and the face of the mechanic to prevent tools, bolts, and the like from falling from the work area onto the facial area of the mechanic.

Reinforcing became an obvious requirement to manufacturers due to heavier workmen or use of the creeper to support heavy equipment and the patent to Hulbert, U.S. Pat. No. 2,084,957, illustrates longitudinal side pieces for strengthening in one direction and transversely oriented pieces mounted below the supporting surface to strengthen the support surface in another direction.

Woelfer received a patent, U.S. Pat. No. 2,124,389, and it illustrates a creeper made from a single piece of material except for the rollers and head rest.

The patent to Henderson, U.S. Pat. No. 2,424,032, discloses that a coaster may be formed from a single blank of plastic, metal, wood, or other materials.

The need for strengthening in mechanic's creeper was again recognized by the patent to Rose, U.S. Pat. No. 4,570,957.

What all of these patents fail to recognize is the substantial amount of labor cost in assembling the product once the various parts are available.

SUMMARY OF THE INVENTION

What this invention does is provide a creeper of superior strength which requires no assembly except for mounting the casters, and they are mounted by the purchaser. It is a one piece blow-molded support structure made from any of several conventional thermoplastic resins which would be well known to those having ordinary skill it the blowmolding art.

The structure includes a flat upper surface of generally rectangular shape with a pair of pockets along each side adjacent one end to hold bolts, wrenches, etc., and the pockets are so located that they will be at about the hips of the prone worker, so as to be easily accessible to his hands without him bending his elbows to any great extent. At the opposite end from the pockets is a raised portion which is used for a head rest.

A ridge is formed on the periphery of the upper surface on both sides and the end having the head rest. No such ridge is formed at the opposite end from the head rest, because it would tend to dig into the hips or upper legs of a workman during the course of his normal operations. The ridge serves to strengthen the apparatus and minimize flexture of the creeper as a whole.

All of these features are formed integrally at the upper surface of the creeper. In a cross-section of the creeper, it would appear that it is formed of upper and lower sheets of about equal thickness and joined at their edges to form a hollow between the sheets as is conventional in a blow molding process. For convenience the top surface will be referred to as the first or upper sheet and the bottom will be referred to as the second or lower sheet.

On the bottom side are a plurality of dimples or truncated cones which extend from the second sheet of the resin into engagement with the upper sheet which forms the flat support surface. Each of the dimples is bonded to the upper surface and tends to keep the two sheets of resin separated, thereby providing a strengthening mechanism against both flexing and twisting. Downwardly projecting mounting supports are molded into the lower surface to accommodate four or more casters which will be installed by the user after the creeper is transported to the job site.

To further strengthen the blow-molded creeper, a plurality of longitudinally extending ribs are formed in the lowre surface which project upwardly to engage and be bonded to the upper resin layer.

A pattern of ribs and truncated cone shaped support surfaces is built into the lower surface, so that three parallel planes extending perpendicular to both the ends of the creeper and the upper surface of the creeper extend through a plurality of at least five bonding points between the upper and lower sheets, two of the bonding points being truncated cones and three being ribs.

Objects of the invention not clear from the above will be fully appreciated upon a detailed reading of the specification and an observation of the drawings which accompany the application and are discussed below.

DESCRIPTION OF THE PREFERRED EMBODIMENT

Figures 1, 2, 3:
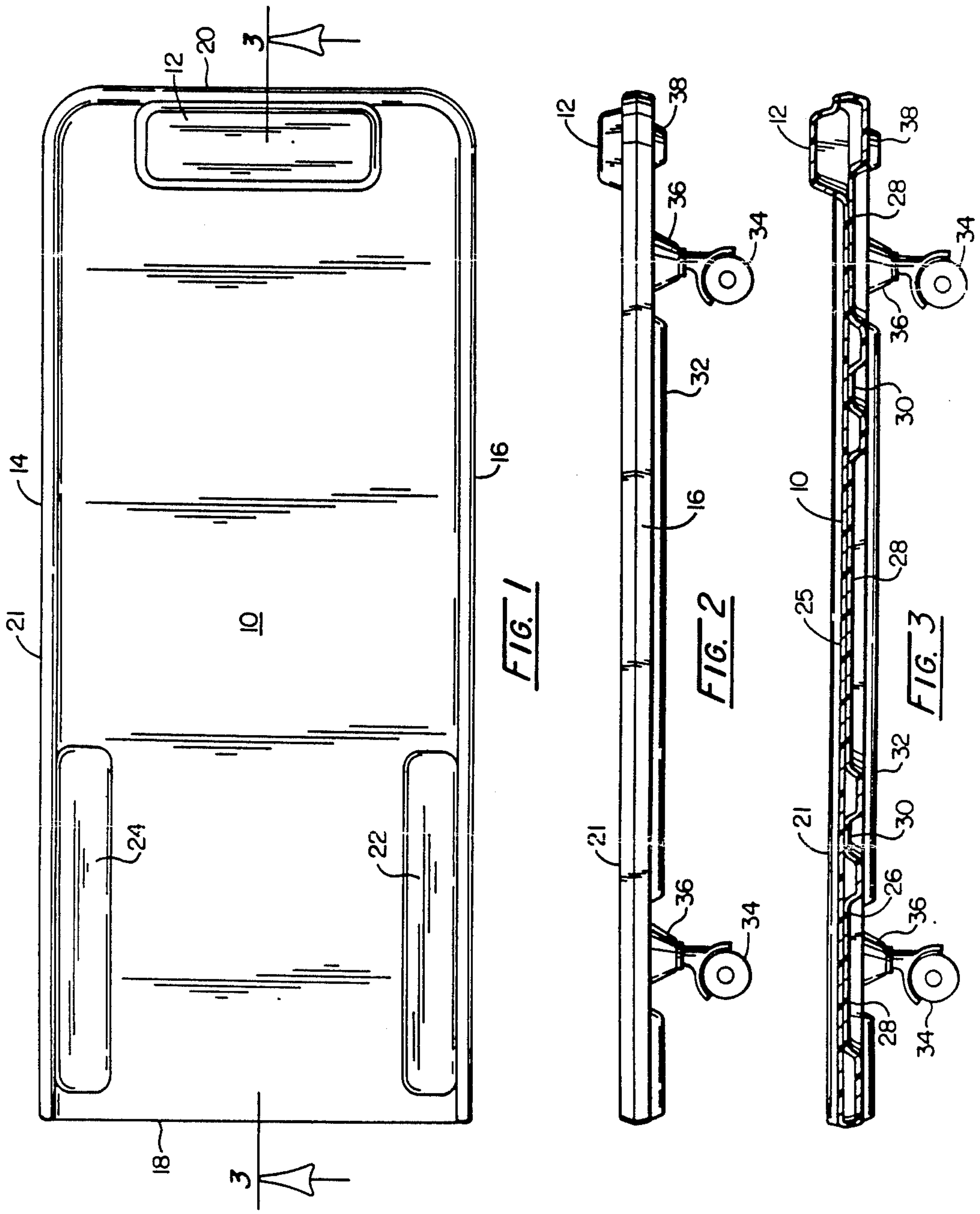
FIG. 1 is a top plan view of this invention for a creeper.
FIG. 2 is a side elevational view of the creeper of FIG. 1.
FIG. 3 is a sectional view taken along line 3—3 of FIG. 1.

This invention relates to a creeper used by a mechanic to support himself and to allow him to move about while in the prone position working under an automobile. Looking to FIG. 1, the creeper includes a flat or planar upper surface 10 and has a raised head rest 12 at one end.

The creper has two sides 14 and 16 and two ends 18 and 20. Two depressions 22 and 24 are formed in the upper surface 10 for purposes of holding bolts, tools, and the like, and the depressions are so located in the upper surface as to be near the hips of the mechanic when he is working and has his head on head rest 12. Thereby, the hands of the workman will very easily be able to rest on the depressions without any substantial twisting or bending of the elbows.

This creeper is formed by blow-molding as a single piece of material and therefore, it is unnecessary to make the depressions 22 and 24 or restructure the head rest 12 after the product is manufactured. Thereby, the manufacturer can save considerable money in terms of labor costs and also save considerable money because of the fact that the creeper is formed hollow, that is, it is blow-molded and thus is very light weight. This contrasts with the solid wood, metallic, and plastic resins which may be on the market at the present time. Metallic and wooden creepers are discussed above in the review of the background of the invention, and the inventor believes there are injection molded creepers around or else they have been discussed, but no documentation is available.

In order to strengthen the upper surface 10 and the creeper as a whole, an upwardly projecting ridge 21 is formed around the periphery of the upper surface 10 along sides 14 and 16 and end 20. It will be observed that there is no such ridge on end 18 and the reason for that is that it would press into the upper legs or lower back of the mechanic while he was working and create unnecessary discomfort.

Looking now to FIGS. 3–6 and particularly FIG. 3, it will be observed that the structure is really composed of what looks like two sheets of resin material, an upper sheet 25 and a lower sheet 26. The lower sheet 26 is considerably different from the flat upper surface. It, the lower sheet, includes a plurality of ribs 28 which project upwardly from the lower sheet 26 into engagement with the upper sheet 24, and this does at least two things. It keeps the sheets partially separated and it provides mechanical strength for the creeper to minimize twisting and bending when a load is placed on the upper surface. The ribs 28 are bonded to the upper sheet 25, and the way this is done is not critical. It may be that the two sheets will bond together to a certain extent when the blow-molding process takes place. On the other hand, it may be that a resin welding process will take place subsequent ot the time the creeper form is removed from the mold.

Figure 4:
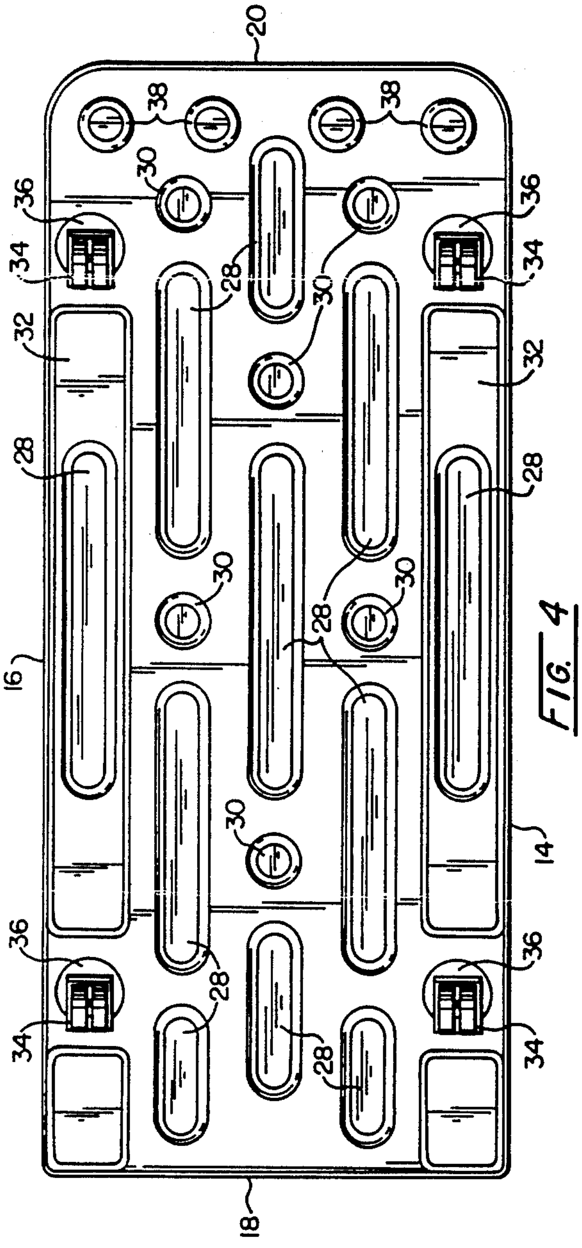
FIG. 4 is a bottom plan view of the creeper of FIG. 1.
Figure 6:
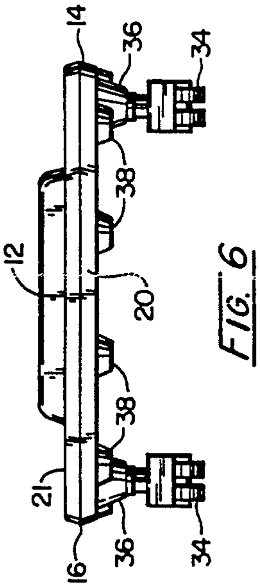
FIG. 6 is an end elevational view of the creeper of FIG. 1 as viewed from the right hand side of FIG. 1.
Figure 5:
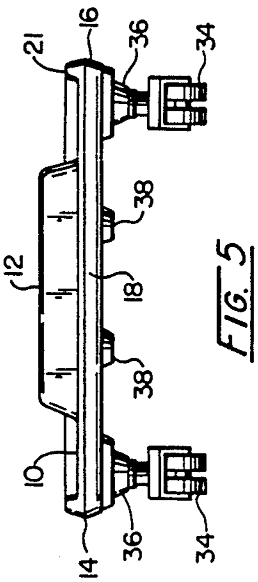
FIG. 5 is an end view of the creeper of FIG. 1 looking from the left hand end as shown in FIG. 1.

It would be observed that there are five parallel lines of ribs 28 as shown in FIG. 4, and in three of those lines there are also truncated cones 30 projecting upwardly from the lower sheet 26 to upper sheet 25. As with the ribs 28, the truncated cones 30 are bonded to the upper sheet 25. Again, this reason is increased strength to minimize deflection and increase mechanical stability.

It will further be observed that the truncated cones 30 and the ribs 28 are arranged in patterns, and the reason for the patterns is the structural strength which results. Observing FIG. 4, one will see that three parallel planes extending perpendicular to the upper surface 10 and to the ends 18 and 20 will each pass through three ridges 28 and two truncated cones 30. In the preferred embodiment, the creeper will be about 15 inches wide and 36 inches long. Accordingly, the distance from one bond to the next nearest bond, either longitudinally or transversely, will be about $2\frac{1}{2}$ to 3 inches and the broken pattern between truncated cone and rib will further serve to give some flexibility of relative movement to the apparatus.

An additional strengthening mechanism formed in the bottom sheet 26 along the central side portions is a downwardly projecting shoulder 32. The combination of the ridge 22 and the shoulders 32 provides the functional equivalent of a pair of side flanges, which will tend to prevent deflection when a workman is in working position or perhaps when a bucket of bolts is rolled around on the creeper. To further ensure mechanical stability utilizing the structural beam concept, one rib is formed in and parallel to the shoulder 32, and the benefits are obvious to a mechanical engineer after the structure has been observed.

Four casters 34 are mounted in appropriate receiving sockets or brackets 36 which project downwardly from the lower sheet 26. Alternatively, the brackets 36 may be mechanically secured to lower sheet 26.

It will be observed that the sockets 36 are located along an axis bisecting shoulders 32 and also very close to the ends of said shoulders. The purpose is to take advantage of the structural beam concept discussed above. The closer the casters are to the ends of the beam or shoulder 32, the less will be the lever arm for bending or twisting of the structure.

Four holding sockets 38 are formed at the end of the creeper nearest the head rest 12, and they are there only for the purpose of holding the casters 34 for shipping. It will be observed in FIG. 4 that the location of the casters in operative position is symmetrical, that is, the axis of rotation of each caster is roughly the same distance from the adjacent end and side as are all of the other casters. The reason for the holding sockets 38 is to allow the sockets to be placed therein for shipping and then an identical creeper with the four casters in the four holding sockets 38 can be boxed in inverted position with two creepers in each box and with the casters all projecting inwardly toward the other creeper. Thereby, the two creepers can be placed in the box with the planar surfaces facing outward and the casters side facing inward.

Having thus described the invention in its preferred embodiment, it will be clear to those having ordinary skill in the art that modifications may be made to the preferred embodiment without departing from the spirit of the invention. Thus, it is not intended that the drawings nor the words used in the specification be limiting on the invention. Rather, it is intended that the invention be limited only by the scope of the appended claims which follow.

I claim:

1. A mechanics creeper including a first thin rectangular upper sheet of resin having a planar upper surface for supporting the mechanic, said upper sheet being connected to a second thin lower sheet of resin, each of said sheets having two ends and two sides, said ends and sides being joined at their periphery, a head rest near one end of the upper sheet, and four casters connected to the lower sheet for engaging a substrate to hold the lower sheet of the creeper out of contact with the substrate, said first sheet including an integral ridge extending along both sides and the end having the head rest, said ridge projecting upwardly from the upper surface to provide mechanical strength and stability, said first sheet being formed integrally with the second sheet and said second sheet being spaced from the upper sheet, said lower sheet including a plurality of ribs projecting upwardly from said lower sheet to engage said first sheet, said ribs extending substantially parallel to each other and substantially perpendicular to said ends, there being no ribs extending parallel to the ends, the engaging portions of the ribs and the first sheet being bonded together to hold the sheets in spaced apart relationship and to provide mechanical stability and strength to the creeper, a plurality of truncated cone shaped projections extending from the lower sheet into contact with the first sheet, each cone shaped projection being aligned with a plurality of ribs and being spaced from each rib, the contacted portions of the first sheet and projections being bonded to each other, the joined ends of the upper and lower sheets farthest from the head rest being configured to have a smooth rounded surface not projecting upward from said planar upper surface whereby no obstruction will engage the body or legs of a prone mechanic lying on said planar surface with his head on the headrest, said planar surface having no elevational change except for said head rest and said integral ridge.

2. The creeper of claim 1 further including a pair of parallel shoulders extending downwardly from the lower surface, one shoulder being located adjacent each side, one caster being mounted in the lower surface adjacent the end and longitudinally aligned with each shoulder.

3. The creeper of claim 2 including elongated depressions in the upper surface adjacent the sides and near the end remote from the head rest, said depressions being configured to serve as a repository for tools and the like with easy hand access to a mechanic in a prone position on the creeper.

4. The creeper of claim 3 including one of said ribs in each shoulder.

5. The creeper of claim 4 including a pattern of bonds between the first and second sheets, the pattern including three equally spaced parallel planes perpendicular to both the planar upper surface and the ends wherein each parallel plane passes through at least five different bonds.

6. The creeper of claim 5 wherein of said at least five different bonds includes three rib bonds and two truncated cone bonds.

7. The creeper of claim 2 including one of said ribs in each shoulder.

8. The creeper of claim 7 including a pattern of bonds between the first and second, the pattern including three equally spaced parallel planes perpendicular to both the planar upper surface and the ends wherein each parallel plane passes through at least five different bonds.

9. The creeper of claim 8 wherein of said at least five different bonds includes three rib bonds and two truncated cone bonds.

10. The creeper of claim 2 including a pattern of bonds between the first and second sheets, the pattern including three equally spaced parallel planes perpendicular to both the planar upper surface and the ends wherein each parallel plane passes through at least five different bonds.

11. The creeper of claim 10 wherein of said at least five different bonds includes three rib bonds and two truncated cone bonds.

12. The creeper of claim 1 including elongated depressions in the upper surface adjacent the sides and near the end remote from the head rest, said depressions being configured to serve as a repository for tools and the like with easy hand access to a mechanic in a prone position on the creeper.

13. The creeper of claim 12 including a pattern of bonds between the first and second sheets, the pattern including three equally spaced parallel planes perpendicular to both the planar upper surface and the ends wherein each parallel plane passes through at least five different bonds.

14. The creeper of claim 13 wherein of said at least five different bonds includes three rib bonds and two truncated cone bonds.

15. The creeper of claim 1 including a pattern of bonds between the first and second sheets, the pattern including three equally spaced parallel planes perpendicular to both the planar upper surface and the ends wherein each parallel plane passes through at least five different bonds.

16. The creeper of claim 15 wherein of said at least five different bonds includes three rib bonds and two truncated cone bonds.

* * * * *